(12) United States Patent
Chen

(10) Patent No.: US 10,762,855 B2
(45) Date of Patent: Sep. 1, 2020

(54) LIQUID CRYSTAL DISPLAY DEVICE

(71) Applicants: HKC Corporation Limited, Shenzhen (CN); Chongqing HKC Oploelectronics Technology Co., ltd., Chongqing (CN)

(72) Inventor: Yu-Jen Chen, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

(*) Notice: Subject to any disclaimer, the term of this patent is extended or adjusted under 35 U.S.C. 154(b) by 75 days.

(21) Appl. No.: 16/087,122

(22) PCT Filed: Dec. 16, 2017

(86) PCT No.: PCT/CN2017/116720
§ 371 (c)(1),
(2) Date: Sep. 21, 2018

(87) PCT Pub. No.: WO2018/121307
PCT Pub. Date: Jul. 5, 2018

(65) Prior Publication Data
US 2019/0101796 A1    Apr. 4, 2019

(30) Foreign Application Priority Data
Dec. 27, 2016    (CN) .......................... 2016 1 1229076

(51) Int. Cl.
*G02F 1/13357*    (2006.01)
*G09G 3/34*    (2006.01)
(Continued)

(52) U.S. Cl.
CPC ......... *G09G 3/3413* (2013.01); *G02F 1/1368* (2013.01); *G02F 1/13306* (2013.01);
(Continued)

(58) Field of Classification Search
CPC .. G02F 1/133602–133611; G09G 3/342–3426
See application file for complete search history.

(56) References Cited

U.S. PATENT DOCUMENTS

| 2002/0008683 A1* | 1/2002 | Makino | G09G 3/3406 345/88 |
| 2007/0035676 A1* | 2/2007 | Hosoya | G02F 1/133512 349/43 |

(Continued)

*Primary Examiner* — Hang Lin
(74) *Attorney, Agent, or Firm* — WPAT, PC

(57) ABSTRACT

A liquid crystal display device includes displaying each picture with two frame images in sequence; drive voltages of adjacent two sub-pixels on each frame image including a high drive voltage and a low drive voltage, and the drive voltages of each sub-pixel in the first frame image and in the second frame image including a high drive voltage and a low drive voltage; determining backlight brightness adjusting signals of each backlight sub-area according to the drive voltages of a first frame image area and a second frame image area corresponding to each backlight sub-area; the backlight brightness adjusting signals being in groups; and performing independent brightness adjustment on a backlight source of the sub-pixels of various colors in corresponding backlight sub-areas in respective frame images of a next picture according to the backlight brightness adjusting signal of each backlight sub-area.

15 Claims, 5 Drawing Sheets

---

S 210
Counting average drive voltages of the sub-pixels of various colors in the first frame image area and the second frame image area corresponding to each backlight sub-area

↓

S 220
Solving the backlight brightness adjustment signals according to the average drive voltages, reference backlight brightness signals and reference drive voltages of respective backlight sub-areas

(51) Int. Cl.
*G02F 1/133* (2006.01)
*G09G 3/20* (2006.01)
*G02F 1/1368* (2006.01)
*G09G 3/36* (2006.01)
*G02F 1/1345* (2006.01)

(52) U.S. Cl.
CPC ...... *G02F 1/13452* (2013.01); *G02F 1/13454* (2013.01); *G02F 1/133602* (2013.01); *G02F 1/133611* (2013.01); *G09G 3/2003* (2013.01); *G09G 3/3426* (2013.01); *G09G 3/3607* (2013.01); *G09G 3/3648* (2013.01); *G09G 3/3666* (2013.01); *G02F 1/133621* (2013.01); *G02F 2001/133601* (2013.01); *G09G 2300/0426* (2013.01); *G09G 2300/0452* (2013.01); *G09G 2310/08* (2013.01); *G09G 2320/028* (2013.01); *G09G 2320/0233* (2013.01); *G09G 2320/0247* (2013.01); *G09G 2320/0285* (2013.01); *G09G 2320/066* (2013.01); *G09G 2320/0626* (2013.01); *G09G 2320/0646* (2013.01); *G09G 2360/16* (2013.01)

(56) References Cited

U.S. PATENT DOCUMENTS

| | | | |
|---|---|---|---|
| 2007/0171163 A1* | 7/2007 | Miyata | G09G 3/3614 345/87 |
| 2013/0337614 A1* | 12/2013 | Fuergut | H01L 23/3121 438/124 |
| 2016/0093255 A1* | 3/2016 | Aoki | G09G 3/3426 345/690 |
| 2017/0061857 A1* | 3/2017 | Lee | H01L 25/0657 |

\* cited by examiner

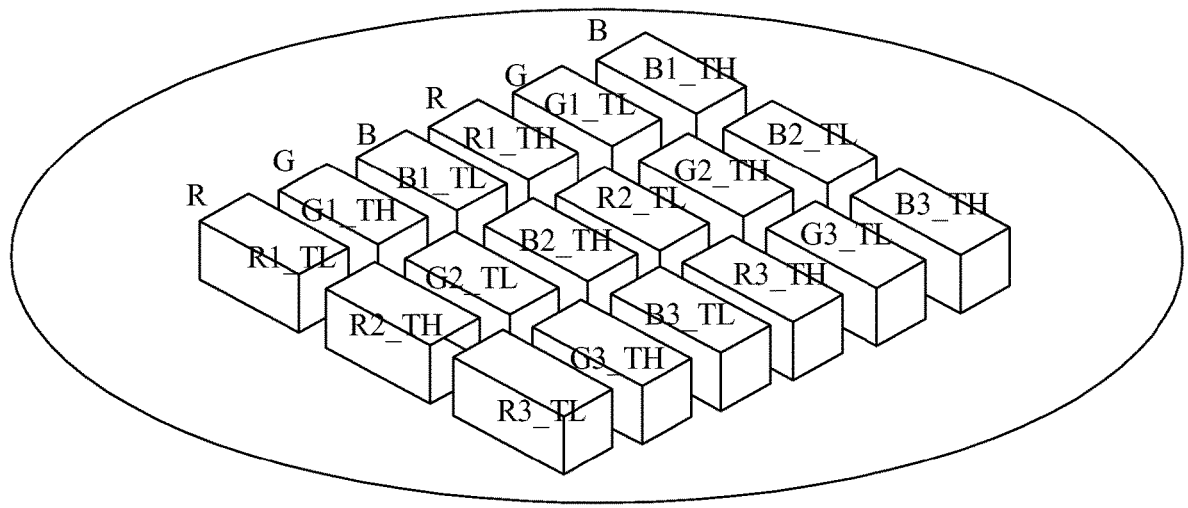

FIG. 5

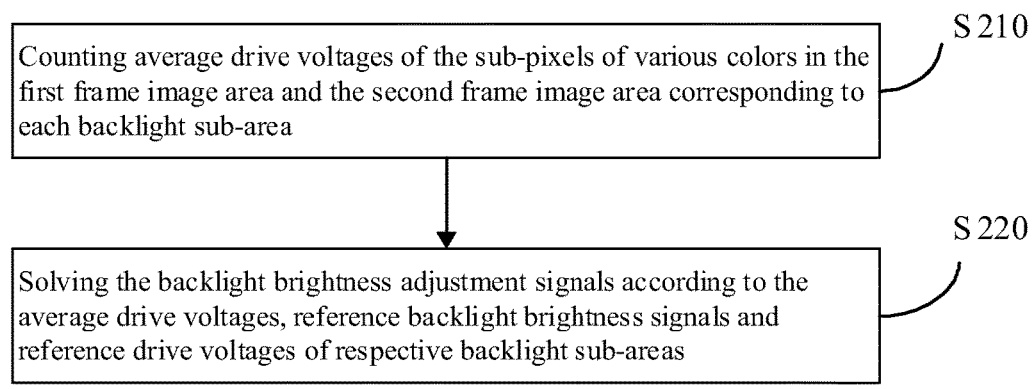

Counting average drive voltages of the sub-pixels of various colors in the first frame image area and the second frame image area corresponding to each backlight sub-area — S 210

Solving the backlight brightness adjustment signals according to the average drive voltages, reference backlight brightness signals and reference drive voltages of respective backlight sub-areas — S 220

FIG. 6

LIQUID CRYSTAL DISPLAY DEVICE

FIELD OF THE DISCLOSURE

The disclosure relates to the field of liquid crystal display technologies, and more particularly to a liquid crystal display device.

BACKGROUND

Typical large-size liquid crystal display devices most adopt a negative type VA liquid crystal or IPS liquid crystal technology. The VA type liquid crystal driving is fast saturated with a drive under a large viewing angle, which leads to relatively severe viewing angle color cast and further affects a picture quality.

SUMMARY

On such basis, it is necessary to provide a liquid crystal display device, which can improve the defect of viewing angle color cast and effectively eliminates bright and dark stripes or a lattice phenomenon of the liquid crystal display panel.

A liquid crystal display device, including a display component and a backlight component divided into a plurality of backlight sub-areas, wherein the liquid crystal display device further includes a display area and a non-display area surrounding the display area, wherein the display area is provided with the display component, and the display component includes a transistor array substrate; and thin film transistors in the thin film transistor array substrate are dual gate electrode transistors; a drive component, disposed in the non-display area and connected to the display component and configured to display each picture with two frame images in sequence; the two frame images include a first frame image and a second frame image; drive voltages of adjacent two sub-pixels on each frame image include a high drive voltage and a low drive voltage, and the drive voltages of each sub-pixel in the first frame image and in the second frame image include a high drive voltage and a low drive voltage; a backlight control component, connected to the drive component and configured to determine backlight brightness adjusting signals of each backlight sub-area according to the drive voltages of a first frame image area and a second frame image area corresponding to each backlight sub-area, wherein the backlight brightness adjusting signals are in groups and a group number is same as a variety number of color sub-pixels; and a backlight adjusting component, connected to the backlight control component and the backlight component respectively, and configured to perform independent brightness adjustment on a backlight source of the sub-pixels of various colors in corresponding backlight sub-areas in respective frame images of a next picture; wherein the non-display area is provided with a source electrode control chip, and the source electrode control chip is electrically connected to source electrodes of the transistors in the transistor array substrate by data lines; and a gate electrode control chip, wherein the gate electrode control chip is electrically connected to gate electrodes of the transistors by scan lines; the source electrode control chip and the gate electrode control chip are located on a same side of the display area, and the gate electrode control chip includes a first gate electrode control chip and a second gate electrode control chip; the first gate electrode control chip, the source electrode control chip and the second gate electrode control chip are sequentially disposed in parallel on a same side of the display area.

The disclosure further discloses another liquid crystal display device, including a display component and a backlight component divided into a plurality of backlight sub-areas, wherein the liquid crystal display device further includes a display area and a non-display area surrounding the display area, wherein the display area is provided with the display component, and the display component includes a transistor array substrate; and thin film transistors in the thin film transistor array substrate are dual gate electrode transistors; a drive component, disposed in the non-display area and connected to the display component and configured to display each picture with two frame images in sequence; the two frame images include a first frame image and a second frame image; drive voltages of adjacent two sub-pixels on each frame image include a high drive voltage and a low drive voltage, and the drive voltages of each sub-pixel in the first frame image and in the second frame image include a high drive voltage and a low drive voltage; a backlight control component, connected to the drive component and configured to determine backlight brightness adjusting signals of each backlight sub-area according to the drive voltages of a first frame image area and a second frame image area corresponding to each backlight sub-area, wherein the backlight brightness adjusting signals are in groups and a group number is same as a variety number of color sub-pixels; and a backlight adjusting component, connected to the backlight control component and the backlight component respectively, and configured to perform independent brightness adjustment on a backlight source of the sub-pixels of various colors in corresponding backlight sub-areas in respective frame images of a next picture; wherein the non-display area is provided with a source electrode control chip, and the source electrode control chip is electrically connected to source electrodes of the transistors in the transistor array substrate by data lines; and a gate electrode control chip, wherein the gate electrode control chip is electrically connected to gate electrodes of the transistors by scan lines; and the source electrode control chip and the gate electrode control chip are located on a same side of the display area.

The disclosure further discloses yet another liquid crystal display device, including a display component and a backlight component divided into a plurality of backlight sub-areas, wherein the liquid crystal display device further includes a display area and a non-display area surrounding the display area, wherein the display area is provided with the display component, and the display component includes a transistor array substrate; and thin film transistors in the thin film transistor array substrate are dual gate electrode transistors; a drive component, disposed in the non-display area and connected to the display component and configured to display each picture with two frame images in sequence; the two frame images include a first frame image and a second frame image; drive voltages of adjacent two sub-pixels on each frame image include a high drive voltage and a low drive voltage, and the drive voltages of each sub-pixel in the first frame image and in the second frame image include a high drive voltage and a low drive voltage; a backlight control component, connected to the drive component and configured to determine backlight brightness adjusting signals of each backlight sub-area according to the drive voltages of a first frame image area and a second frame image area corresponding to each backlight sub-area, wherein the backlight brightness adjusting signals are in groups and a group number is same as a variety number of color sub-pixels; and a backlight adjusting component, connected to the backlight control component and the backlight component respectively, and configured to perform independent brightness adjustment on a backlight source of the sub-pixels of various colors in corresponding backlight sub-areas in respective frame images of a next picture; wherein the backlight control component includes a counting unit, configured to count average drive voltages of the sub-pixels of various colors in the first frame image area and the second frame image area corresponding to each backlight sub-area; and a calculating unit, configured to solve the backlight brightness adjustment signals according to the average drive voltages, reference backlight brightness signals and reference drive voltages of respective backlight sub-areas; wherein the non-display area is provided with a source electrode control chip, and the source electrode control chip is electrically connected to source electrodes of the transistors in the transistor array substrate by data lines; and a gate electrode control chip, wherein the gate electrode control chip is electrically connected to gate electrodes of the transistors by scan lines; the source electrode control chip and the gate electrode control chip are located on a same side of the display area, and the gate electrode control chip includes a first gate electrode control chip and a second gate electrode control chip; the first gate electrode control chip, the source electrode control chip and the second gate electrode control chip are sequentially disposed in parallel on a same side of the display area.

According to the liquid crystal display device, each picture is displayed by two frame images in sequence, each frame image is driven by adopting high and low alternate voltage signals, the high and low drive voltages of the first frame image and the second frame image are inverted, and the backlight brightness adjusting signals of one picture are generated according to respective drive voltages to perform independent backlight adjustment on the backlight source of the sub-pixels of various colors in the corresponding backlight sub-areas in the respective frame images of the next picture. According to the above liquid crystal display device, brightness compensation for each backlight sub-area M is supplemented, such that not only is the whole panel brightness maintained to be not different from an uncompensated typical drive brightness, but also a Low color shift viewing angle compensation effect can also be realized, the flickering discomfort phenomenon visible to naked eyes caused by a switching difference of the high and low voltages during the original driving is avoided, and the defect of color cast caused by mismatch of a large viewing angle refractive index of the liquid crystal display device is effectively improved. The above liquid crystal display device can realize cooperative driving in time domain and space domain. Besides, the pixels on the display component do not need to be divided into main and second pixels again, thereby greatly reducing a technological complexity of the display panel, greatly improving a transmittance and a resolution of the liquid crystal display panel, and reducing a backlight design cost.

BRIEF DESCRIPTION OF THE DRAWINGS

FIGS. 4 and 5 are componential enlarged views in FIG. 3.

FIG. 6 is a specific flowchart of step S120 in FIG. 1.

DETAILED DESCRIPTION OF PREFERRED EMBODIMENTS

In order to make the objects, technical solutions and advantages of the disclosure clearer, the disclosure is further described in detail in combination with drawings and embodiments. It should be understood that the specific embodiments described here are merely intended for explaining rather than limiting the disclosure.

Figure 1:
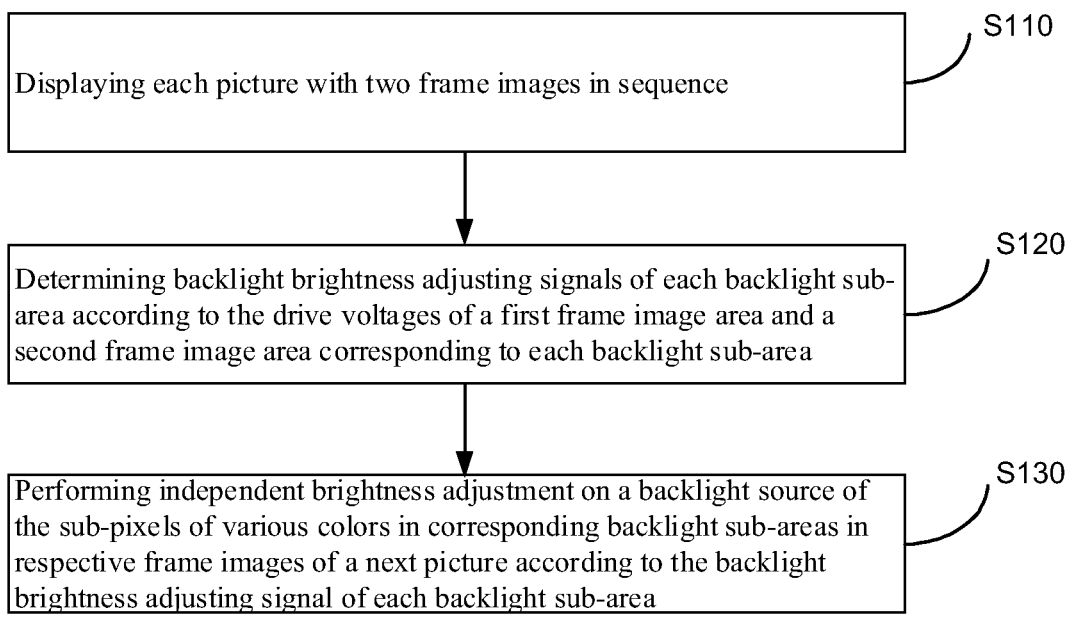
FIG. 1 is a flowchart of a driving method for a liquid crystal display device in one embodiment.
Figure 2:
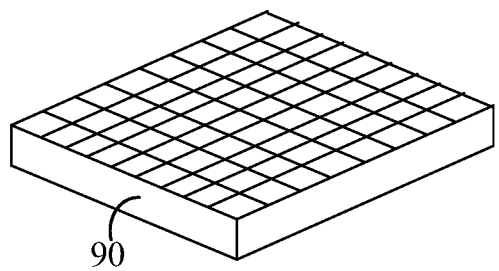
FIG. 2 is a schematic view of sub-areas of a backlight area of the liquid crystal display device in FIG. 1.

FIG. 1 is a flowchart of a driving method for a liquid crystal display device in one embodiment. The liquid crystal display device may be a TN, OCB, VA type or curve surface liquid crystal display device, but not limited thereto. The liquid crystal display device can apply straight down backlight, and a backlight source may be white light, an RGB thee-color light source, an RGBW four-color light source or an RGBY four-color light source, but not limited thereto. The driving method is also suitable for a scenario that a display panel of the liquid crystal display device is a curve panel. In the present embodiment, a backlight area of the liquid crystal display device is divided into a plurality of backlight sub-areas, as shown in FIG. 2. In FIG. 2, 90 represents a backlight component (or backlight module).

Referring to FIG. 1, the method includes the following steps.

S110 displaying each picture with two frame images in sequence.

Figure 3:
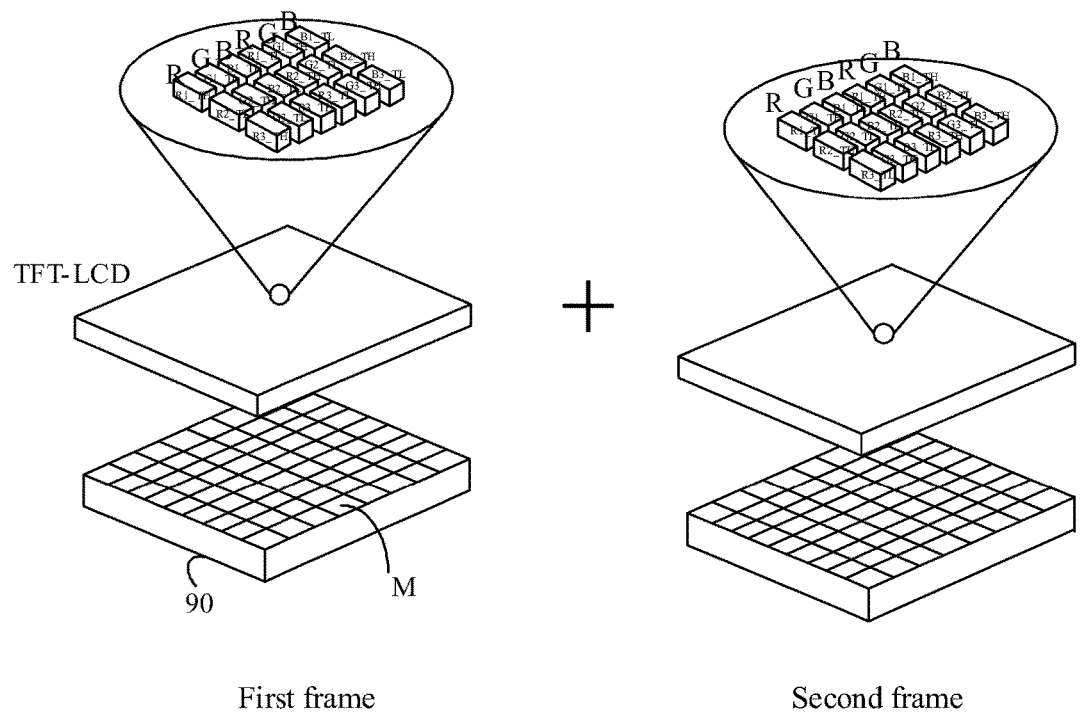
FIG. 3 is a schematic view of driving a display area of the liquid crystal display device in FIG. 1.
Figure 4:
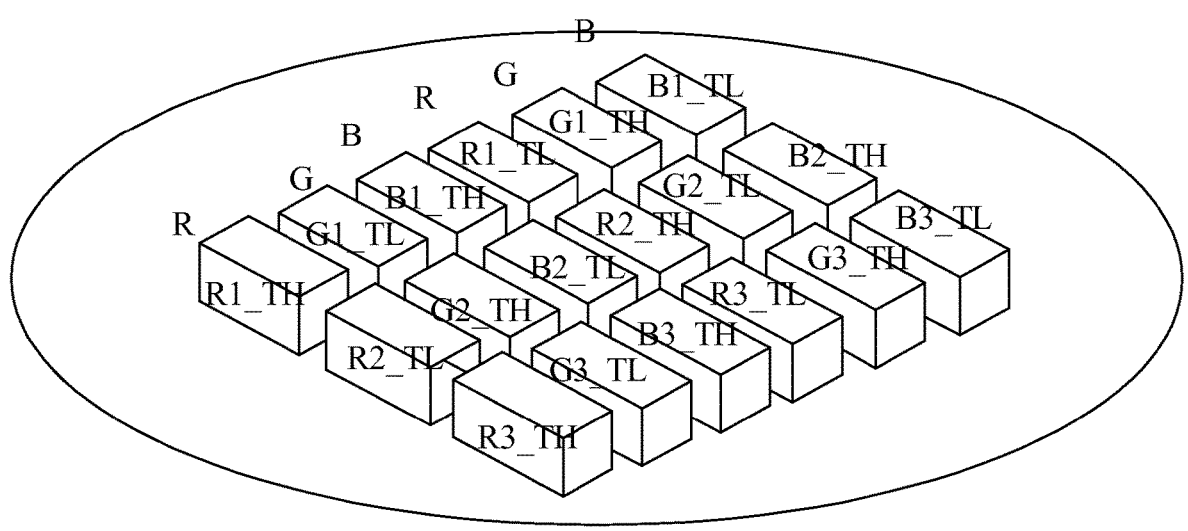

Each picture frame_N (i.e., a typical frame picture) is displayed with two frame images in sequence, that is, the picture is divided into two images on timing sequence. By dividing the picture on the timing sequence, a frame frequency can be doubled, that is, the original 60 Hz is doubled to 120 Hz. The two frame images are a first frame image (frame_N-1) and a second frame image (frame_N-2) respectively. The picture corresponding to an input signal is displayed for a user by mutual compensation of the first frame image and the second frame image. In the present embodiment, drive voltages of adjacent two sub-pixels on each frame image include a high drive voltage and a low drive voltage, and the drive voltages of each sub-pixel in the first frame image and in the second frame image include a high drive voltage and a low drive voltage. That is, the drive voltage of each sub-pixel of the first frame image is inverted to be the drive voltage for each sub-pixel of the second frame image. The drive voltages for each sub-pixel in the first frame image and the second frame image may be acquired by looking up a lookup table (LUT). Specifically, the liquid crystal display device will prestore the lookup table in a hardware frame buffer. The lookup table is a corresponding relation table of the drive voltage of each sub-pixel in the first frame image and the second frame image corresponding to an input signal and the input signal. Seen from a 8 bit drive signal, input color gray scale values 0-255 of every R/G/B input signal correspond to 256 pairs of high and low voltage signals, and there are 3*256 pairs of high voltage signals $R_{TH}/G_{TH}/B_{TH}$ and low voltage signals $R_{TL}/G_{TL}/B_{TL}$ in total. Therefore, the corresponding high drive voltage and the corresponding low drive voltage can be looked up according to the color gray scale value of each sub-pixel in the input signal, such that the corresponding sub-pixel in the first frame image is driven by the high drive voltage, and the corresponding sub-pixel in the second frame image is driven by the low drive voltage, or the corresponding sub-pixel in the first frame image is driven by the low drive voltage, and the corresponding sub-pixel in the second frame image is driven by the high drive voltage, and meanwhile, the adjacent two sub-pixels are driven by a driving manner of alternate high and low drive voltages, as shown in FIG. 3. Wherein FIG. 4 is a componential enlarged view in a first frame in FIG. 3, and FIG. 5 is a componential enlarged view in a second frame in FIG. 3.

S120 determining backlight brightness adjusting signals of each backlight sub-area according to the drive voltages of a first frame image area and a second frame image area corresponding to each backlight sub-area.

The backlight brightness adjusting signals are configured to perform backlight brightness adjustment on two frame images in a next picture, to reduce a viewing angle color cast of the picture. The backlight brightness adjusting signals are in groups ($A_{M\_P1}$ and $A_{M\_P2}$), to adjust the backlight brightness of the backlight sub-areas corresponding to the first frame image and the second frame image respectively. Besides, a group number of the backlight brightness adjusting signals is same as a variety number of color sub-pixels, to perform independent backlight brightness control on the sub-pixels of various colors. For example, in the present embodiment, the color sub-pixels include red sub-pixels (R sub-pixels), green sub-pixels (G sub-pixels) and blue sub-pixels (B sub-pixels). Therefore, each group of backlight brightness adjusting signals includes an R sub-pixel backlight brightness adjusting signal group, a G sub-pixel backlight brightness adjusting signal group and a B sub-pixel backlight brightness adjusting signal group, to perform independent backlight brightness control on the sub-pixels of various colors in respective backlight sub-areas.

In the present embodiment, a flow of determining the backlight brightness adjusting signals is as shown in FIG. 6, and includes S210 and S220.

S210 counting average drive voltages of the sub-pixels of various colors in the first frame image area and the second frame image area corresponding to each backlight sub-area.

A calculating formula for the average drive voltage of the sub-pixels of each color in the corresponding first frame image area in each backlight sub-area is as follows:

$$P_{M\_ave1} = \text{Ave}(P_{M\_n\_TL}, P_{M\_n+1\_TH}, P_{M\_n+2\_TL}, \ldots), n=1,2,3 \ldots$$

Wherein P represents a target color sub-pixel, M represents a serial number of the backlight sub-area, ave1 represents an average drive voltage value of the first image, and n represents a sequence number of the P sub-pixel in the M backlight sub-area.

Specifically, the average drive voltages for the sub-pixels of various colors are calculated as follows:

$$R_{M\_ave1} = \text{Ave}(R_{M\_n\_TL}, R_{M\_n+1\_TH}, R_{M\_n+2\_TL}, \ldots), n=1,2,3 \ldots;$$

$$G_{M\_ave1} = \text{Ave}(G_{M\_n\_TH}, G_{M\_n+1\_TL}, G_{M\_n+2\_TH}, \ldots), n=1,2,3 \ldots;$$

$$B_{M\_ave1} = \text{Ave}(B_{M\_n\_TL}, B_{M\_n+1\_TH}, B_{M\_n+2\_TL}, \ldots), n=1,2,3 \ldots$$

S220 solving the backlight brightness adjustment signals according to the average drive voltages, reference backlight brightness signals and reference drive voltages of respective backlight sub-areas.

The reference backlight brightness signal refers to the backlight brightness signal when no compensation of high and low voltages (i.e., a typical driving manner) is required. The reference drive voltage refers to the drive voltage of various sub-pixels when no compensation of high and low voltages is performed. Since the backlight source corresponding to the sub-pixels of various colors in each sub-area is independently controlled, the backlight brightness adjusting signals of the backlight source corresponding to the sub-pixels of various colors in each sub-area need to be solved. A calculating formula for the backlight brightness adjustment signal of the sub-pixels of each color in each backlight sub-area M is as follows:

$$A_{M\_P1} * P_{M\_ave1} = A_{M\_P2} * P_{M\_ave2};$$

$$2 * A_{M\_P} * P_{M\_ave} = A_{M\_P1} * P_{M\_ave1} + A_{M\_P2} * P_{M\_ave2};$$

Wherein P represents a target color sub-pixel; M represents a serial number of the backlight sub-area. $A_{M\_P1}$ represents the backlight brightness adjustment signal for performing backlight brightness adjustment on a backlight source of P sub-pixels in the backlight sub-area M corresponding to the first frame image of the next picture. $A_{M\_P2}$ represents the backlight brightness adjustment signal for performing backlight brightness adjustment on a backlight source of the P sub-pixels in the backlight sub-area M corresponding to the second frame image of the next picture. $P_{M\_ave1}$ represents an average value of the drive voltages of the P sub-pixels in the backlight sub-area M corresponding to the first frame image of the current picture. In the present embodiment, since the drive voltage of the sub-pixel is matched with the input signal (i.e., a gray scale value of the corresponding color), the average value of the drive voltages can serve as an evaluation parameter for viewing angle brightness of the color sub-pixels. $P_{M\_ave2}$ represents an average value of the drive voltages of the P sub-pixels in the backlight sub-area M corresponding to the second frame image of the current picture. $P_{M\_ave}$ represents the reference backlight brightness signal of the P sub-pixels in the backlight sub-area M corresponding to the image of the current picture. $P_{M\_ave}$ represents the average value of reference drive voltages of the P sub-pixels in the frame image area corresponding to the backlight sub-area M on the image of the current picture. Specifically, $P_{M\_ave1} = \text{Ave}(P_n + P_{n+1} + P_{n+2} + \ldots)$, n=1, 2, 3 . . .

In the present embodiment, one pixel of each frame image includes an R sub-pixel, a G sub-pixel and a B sub-pixel. Therefore, correspondingly, it is required to solve the backlight brightness adjusting signals of the backlight source of the sub-pixels of various colors in each backlight sub-area, specifically:

A solving formula for the backlight brightness adjusting signals $A_{M\_R1}$ and $A_{M\_R2}$ of the R sub-pixels in the backlight sub-area M is $$A_{M\_R1} * R_{M\_ave1} = A_{M\_R2} * R_{M\_ave2};$$

$$2 * A_{M\_R} * R_{M\_ave} = A_{M\_R1} * R_{M\_ave1} + A_{M\_R2} * R_{M\_ave2}.$$

A solving formula for the backlight brightness adjusting signals $A_{M\_G1}$ and $A_{M\_G2}$ of the G sub-pixels in the backlight sub-area M is $$A_{M\_G1} * G_{M\_ave1} = A_{M\_G2} * G_{M\_ave2};$$

$$2 * A_{M\_G} * G_{M\_ave} = A_{M\_hd\ G1} * G_{M\_ave1} + A_{M\_G2} * G_{M\_ave2}.$$

A solving formula for the backlight brightness adjusting signals $A_{M\_B1}$ and $A_{M\_B2}$ of the B sub-pixels in the backlight sub-area M is $$A_{M\_B1}*B_{M\_ave1}=A_{M\_B2}*B_{M\_ave2};$$

$$2*A_{M\_B}*B_{M\_ave}=A_{M\_B1}*B_{M\_ave1}+A_{M\_B2}*B_{M\_ave2}.$$

S130 performing independent brightness adjustment on a backlight source of the sub-pixels of various colors in corresponding backlight sub-areas in respective frame images of a next picture according to the backlight brightness adjusting signal of each backlight sub-area.

In the adjusting process, the backlight sources of the R sub-pixels, the G sub-pixels and the B sub-pixels in the corresponding backlight sub-area M of the first frame image in the next picture are independently adjusted according to $A_{M\_R1}$, $A_{M\_G1}$ and $A_{M\_B1}$, and the backlight sources of the R sub-pixels, the G sub-pixels and the B sub-pixels in the corresponding backlight sub-area M of the second frame image in the next picture are independently adjusted according to $A_{M\_R2}$, $A_{M\_G2}$ and $A_{M\_B2}$, such that the compensated picture brightness is same as the picture brightness not compensated by the high and low voltages (i.e., typical driving). By independent backlight source control, the flickering discomfort phenomenon visible to naked eyes caused by a switching difference of the high and low voltages during driving can be reduced, and the defect of color cast caused by mismatch of a large viewing angle refractive index of the liquid crystal display device is effectively improved.

According to the driving method for a liquid crystal display device, each picture is displayed by two frame images in sequence, each frame image is driven by adopting high and low alternate voltage signals, the high and low drive voltages of the first frame image and the second frame image are inverted, and the backlight brightness adjusting signals of one picture are generated according to respective drive voltages to perform independent backlight adjustment on the backlight source of the sub-pixels of various colors in the corresponding backlight sub-areas in the respective frame images of the next picture. According to the above liquid crystal display device, brightness compensation for each backlight sub-area M is supplemented, such that not only is the whole panel brightness maintained to be not different from an uncompensated typical drive brightness, but also a Low color shift viewing angle compensation effect can also be realized, the flickering discomfort phenomenon visible to naked eyes caused by a switching difference of the high and low voltages during the original driving is avoided, and the defect of color cast caused by mismatch of a large viewing angle refractive index of the liquid crystal display device is effectively improved. The above liquid crystal display device can realize cooperative driving in time domain and space domain. Besides, the pixels on the display component do not need to be divided into main and second pixels again, thereby greatly reducing a technological complexity of the display panel, greatly improving a transmittance and a resolution of the liquid crystal display panel, and reducing a backlight design cost.

Figure 7:
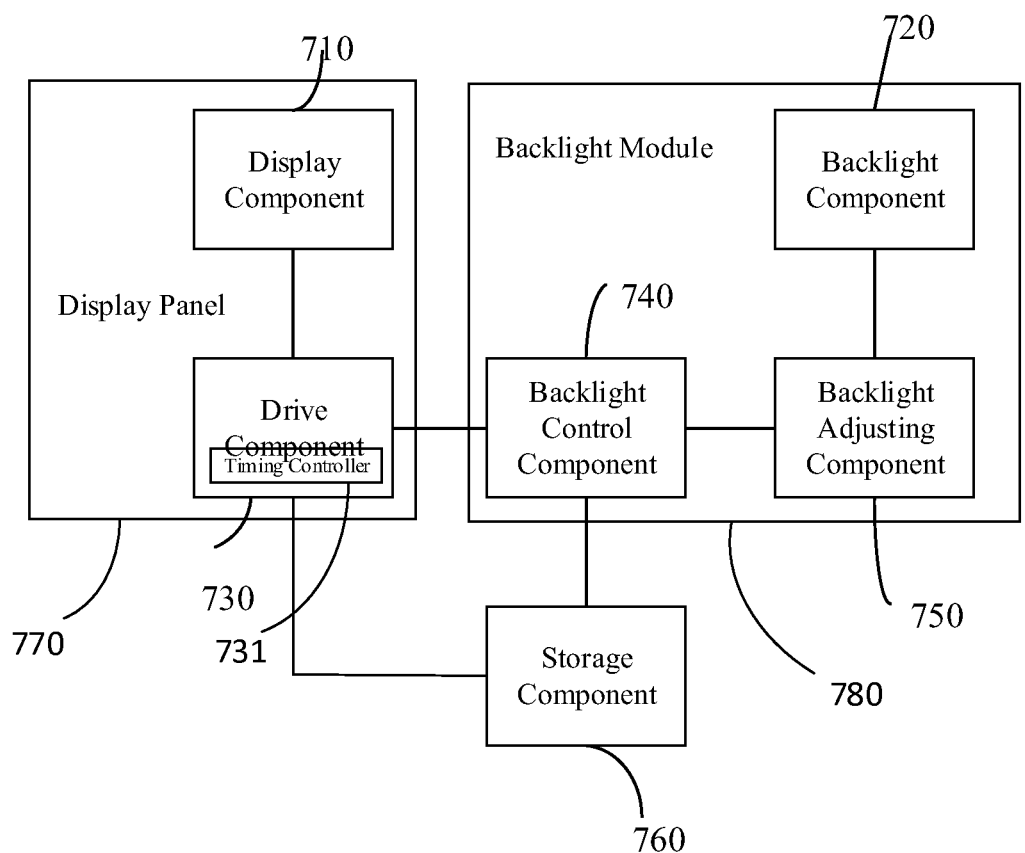
FIG. 7 is a structural block diagram of a liquid crystal display device in one embodiment.

The disclosure further provides a liquid crystal display device, as shown in FIG. 7. The liquid crystal display device may execute the above driving method. The liquid crystal display device includes a display component 710 and a backlight component 720 and further includes a drive component 730, a backlight control component 740 and a backlight adjusting component 750. Wherein the display component 710 and the drive component 730 can be integrated on a display panel 770, and the backlight component 720, the backlight control component 740 and the backlight adjusting component 750 can be integrated on the backlight module 780. It is understandable that an integration manner of respective components is not limited thereto.

The display component 710 may adopt a TN, OCB or VA type TFT display panel, but not limited thereto. The display component 710 can be a display component having a curve surface panel.

The backlight component 720 is configured to provide backlight. The backlight component 720 may apply straight down backlight, and a backlight source may be white light, an RGB thee-color light source, an RGBW four-color light source or an RGBY four-color light source, but not limited thereto. The backlight area of the backlight component 720 is divided into a plurality of backlight subareas, as shown in FIG. 2.

The drive component 730 is connected to the display component 710. The drive component 730 is configured to display each picture with two frame images. The two frame images are a first frame image and a second frame image respectively. The picture corresponding to an input signal is displayed for a user by mutual compensation of the first frame image and the second frame image. In the present embodiment, drive voltages of adjacent two sub-pixels on each frame image include a high drive voltage and a low drive voltage, and the drive voltages of each sub-pixel in the first frame image and in the second frame image include a high drive voltage and a low drive voltage. That is, the drive voltage of each sub-pixel of the first frame image is inverted to be the drive voltage for each sub-pixel of the second frame image. The drive voltages for the drive component 730 to drive each sub-pixel may be acquired by looking up a lookup table (LUT). Specifically, the liquid crystal display device will prestore the lookup table in a hardware frame buffer. The lookup table is a corresponding relation table of the drive voltage of each sub-pixel in the first frame image and the second frame image corresponding to an input signal and the input signal. The drive component 730 includes a timing control circuit 731 (timing controller). In one embodiment, the liquid crystal display device further includes a storage device 760, for storing the lookup table.

The backlight control component 740 is connected to the drive component 730 and configured to determine backlight brightness adjusting signals of each backlight sub-area according to the drive voltages of a first frame image area and a second frame image area corresponding to each backlight sub-area. The backlight brightness adjusting signals are in groups ($A_{M\_P1}$ and $A_{M\_P2}$), to adjust the backlight brightness of the backlight sub-areas corresponding to the first frame image and the second frame image respectively. Besides, a group number of the backlight brightness adjusting signal is same as a variety number of color sub-pixels, to perform independent backlight brightness control on the sub-pixels of various colors. For example, in the present embodiment, the color sub-pixels include red sub-pixels (R sub-pixels), green sub-pixels (G sub-pixels) and blue sub-pixels (B sub-pixels). Therefore, each group of backlight brightness adjusting signals includes an R sub-pixel backlight brightness adjusting signal group, a G sub-pixel backlight brightness adjusting signal group and a B sub-pixel backlight brightness adjusting signal group, to perform independent backlight brightness control on the sub-pixels of various colors in respective backlight sub-areas.

Figure 8:
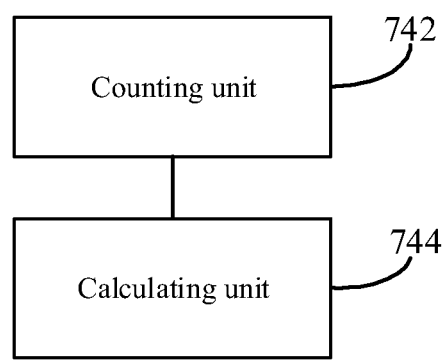
FIG. 8 is a structural block diagram of a backlight control component in one embodiment.

The backlight control component 740 includes a counting unit 742 and a calculating unit 744, as shown in FIG. 8.

Wherein a formula for the counting unit 742 to calculate the average drive voltage of the sub-pixels of each color in the corresponding first frame image area in each backlight sub-area is as follows:

$$P_{M\_ave1}=Ave(P_{M\_n\_TL}, P_{M\_n+1\_TH}, P_{M\_n+2\_TL}, \ldots), n=1,2,3\ldots$$

Wherein P represents a target color sub-pixel, M represents a serial number of the backlight sub-area, ave1 represents an average drive voltage value of the first image, and n represents a sequence number of the P sub-pixel in the M backlight sub-area.

Specifically, the average drive voltages for the sub-pixels of various colors are calculated as follows:

$$R_{M\_ave1}=Ave(R_{M\_n\_TL}, R_{M\_n+1\_TH}, R_{M\_n+2\_TL}, \ldots), n=1,2,3\ldots;$$

$$G_{M\_ave1}=Ave(G_{M\_n\_TH}, G_{M\_n+1\_TL}, G_{M\_n+2\_TH}, \ldots, n=1,2,3\ldots;$$

$$B_{M\_ave1}=Ave(B_{M\_n\_TL}, B_{M\_n+1\_TH}, B_{M\_n+2\_TL}, \ldots, n=1,2,3\ldots$$

The calculating unit 744 is configured to solve the backlight brightness adjustment signals according to the average drive voltages, reference backlight brightness signals and reference drive voltages of respective backlight sub-areas. The reference backlight brightness signal refers to the backlight brightness signal when no compensation of high and low voltages (i.e., a typical driving manner) is required. The reference drive voltage refers to the drive voltage of various sub-pixels when no compensation of high and low voltages is performed. Since the backlight source of the sub-pixels of various colors in each sub-area is independently controlled, the backlight brightness adjusting signals of the backlight source corresponding to the sub-pixels of various colors in each sub-area need to be solved. A calculating formula for the backlight brightness adjustment signal of the sub-pixels of each color in each backlight sub-area M is as follows:

$$A_{M\_P1}*P_{M\_ave1}=A_{M\_P2}*P_{M\_ave2};$$

$$2*A_{M\_P}*P_{M\_ave}=A_{M\_P1}*P_{M\_ave1}+A_{M\_P2}*P_{M\_ave2}.$$

Wherein P represents a target color sub-pixel; M represents a serial number of the backlight sub-area. $A_{M\_P1}$ represents the backlight brightness adjustment signal for performing backlight brightness adjustment on a backlight source of P sub-pixels in the backlight sub-area M corresponding to the first frame image of the next picture. $A_{M\_P2}$ represents the backlight brightness adjustment signal for performing backlight brightness adjustment on a backlight source of the P sub-pixels in the backlight sub-area M corresponding to the second frame image of the next picture. $P_{M\_ave1}$ represents an average value of the drive voltages of the P sub-pixels in the backlight sub-area M corresponding to the first frame image of the current picture. In the present embodiment, since the drive voltage of the sub-pixel is matched with the input signal (i.e., a gray scale value of the corresponding color), the average value of the drive voltages can serve as an evaluation parameter for viewing angle brightness of the color sub-pixels. $P_{M\_ave2}$ represents an average value of the drive voltages of the P sub-pixels in the backlight sub-area M corresponding to the second frame image of the current picture. $A_{M\_P}$ represents the reference backlight brightness signal of the P sub-pixels in the backlight sub-area M corresponding to the image of the current picture. $P_{M\_ave}$ represents the average value of reference drive voltages of the P sub-pixels in the frame image area corresponding to the backlight sub-area M on the image of the current picture. Specifically, $P_{M\_ave1}=Ave(P_n+P_{n+1}+P_{n+2}+\ldots)$, n=1, 2, 3 \ldots The backlight adjusting component 750 is connected to the backlight control component 740 and the backlight component 720 respectively. The backlight adjusting component 750 is configured to perform independent brightness adjustment on a backlight source of the sub-pixels of various colors in corresponding backlight sub-areas in respective frame images of a next picture according to the backlight brightness adjusting signal in each backlight sub-area, such that the compensated picture brightness is same as the picture brightness not compensated by the high and low voltages.

Figure 9:
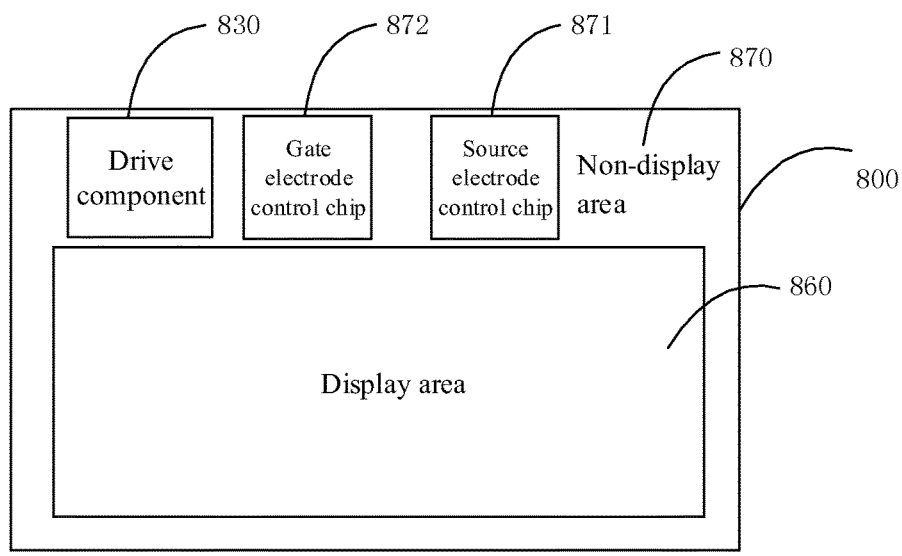
FIG. 9 is another structural schematic diagram of a liquid crystal display device of one embodiment.
Figure 10:
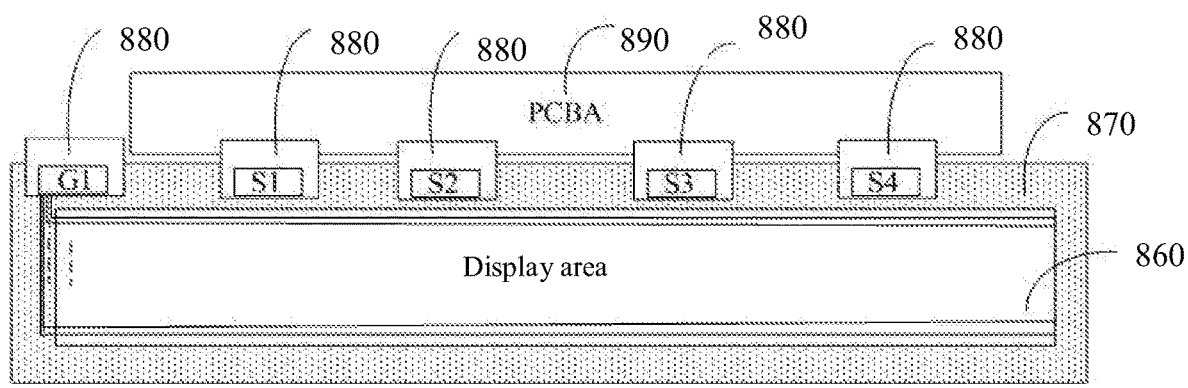
FIG. 10 is yet another structural schematic diagram of a liquid crystal display device of one embodiment.

Further, referring to FIGS. 9 and 10, the present embodiment further provides a control circuit structure of such liquid crystal display device. The liquid crystal display device 800 further includes a display area 860 and a non-display area 870 surrounding the display area 860.

Wherein the display area 860 is provided with a pixel array, and each pixel unit is provided with a transistor array substrate (not shown); the non-display area 870 is provided with the drive component 830, a source electrode control chip 871 and a gate electrode control chip 872, and the drive component 830, the source electrode control chip 871 and the gate electrode control chip 872 are located on a same side of the display area 860.

Wherein the source electrode control chip 871 is electrically connected to source electrodes (not shown) of the transistors in the transistor array substrate by data lines; and the gate electrode control chip 872 is electrically connected to gate electrodes (not shown) of the transistors by scan lines (not shown).

Specifically, the source electrode control chip 872 includes a first gate electrode control chip and a second gate electrode control chip. The first gate electrode control chip and the second gate electrode control chip control two gate electrodes of the thin film transistors respectively. The first gate electrode control chip, the source electrode control chip 871 and the second gate electrode control chip are disposed on a same side of the display area 860, and are equentially disposed on the non-display area 870 on a same side of the display area 860 in parallel. An amount of a row of transverse thin film transistors on the thin film transistor array substrate is larger than an amount of a column of longitudinal thin film transistors. The first gate electrode control chip, the source electrode control chip 871 and the second gate electrode control chip are disposed in one direction with more thin film transistors in parallel. In the present embodiment, the liquid crystal display screen is an elongated screen, and the first gate electrode control chip, the source electrode control chip 871 and the second gate electrode control chip are located on a transverse side of the display area 860. Positions for chips do not need to be reserved in the non-display area 870 in other three sides of the display area 860. Therefore, widths of corresponding areas of the non-display area 870 can be reduced, such that the widths D3 and D4 can be reduced to a target width according to needs, and the need of narrow frame of the liquid crystal display screen is met. Meanwhile, the first gate electrode control chip, the second gate electrode control chip and the source electrode control chip 871 are disposed on the same side. The source electrode control chip and the gate electrode control chip can be bonded in a same bonding procedure, thereby reducing the bonding procedure, reducing a manufacturing cost and improving production efficiency.

As shown in FIG. 10, the first gate electrode control chip is a gate electrode control chip G1, and the second gate electrode control chip is a gate electrode control chip G2. The source electrode control chip 871 includes a source electrode control chip S1, a source electrode control chip S2, a source electrode control chip S3 and a source electrode control chip S4. The gate electrode control chip G1 and the gate electrode control chip G2 (not shown) are connected to two gate electrodes of the thin film transistors in the display area 860 respectively to control the two electrodes of the thin film transistors respectively. By using the dual gate electrode thin film transistors, a control capacity can be increased, such that larger liquid crystal display devices can be adapted. The source electrode control chip S1, the source electrode control chip S2, the source electrode control chip S3 and the source electrode control chip S4 are respectively fixed on a flexible circuit board 880 by adopting a tape carrier package manner, and are connected to a printing circuit board (PCBA) 890 by the flexible circuit board 880. The source electrode control chip S1, the source electrode control chip S2, the third electrode control chip S3 and the source electrode control chip S4 are connected to source electrodes of the thin film transistors by data lines respectively, thereby controlling the thin film transistor array by the source electrode control chip S1, the source electrode control chip S2, the source electrode control chip S3 and the source electrode control chip S4 as well as the gate electrode control chip G1 and the gate electrode control chip G2, and further realizing picture display of the display area.

The respective technical features of the above embodiments can be freely combined, in order for concise description, not all possible combinations of the respective technical features of the above embodiments are described, however, as long as the combinations of these respective technical features do not conflict against each other, they are considered to be in a range recorded by the disclosure.

The foregoing merely expresses several embodiments of the disclosure, which are described in a relatively specific and detailed manner, but should be understood as a limitation to the scope of the disclosure. It should be pointed out that those ordinary skilled in the art could make a plurality of transformations and improvements without departing from a concept of the disclosure, and they all fall within the protective scope of the disclosure. Therefore, a protective scope of the disclosure should take appended claims as a criterion.

What is claimed is:

1. A liquid crystal display device, comprising a display panel having a display component and a backlight module, the backlight module being divided into a plurality of backlight sub-areas, wherein the liquid crystal display device further comprises
a display area and a non-display area surrounding the display area, wherein the display area is provided with the display component, and the display component comprises a transistor array substrate; and thin film transistors in the thin film transistor array substrate are dual gate electrode transistors;
a drive component, disposed in the non-display area and connected to the display component and configured to display each picture with two frame images in sequence; the two frame images comprise a first frame image and a second frame image; drive voltages of adjacent two sub-pixels on each frame image comprise a high drive voltage and a low drive voltage, and the drive voltages of each sub-pixel in the first frame image and in the second frame image comprise a high drive voltage and a low drive voltage;
a backlight control component, connected to the drive component and configured to determine backlight brightness adjusting signals of each backlight sub-area according to the drive voltages of a first frame image area and a second frame image area corresponding to each backlight sub-area, wherein the backlight brightness adjusting signals are in groups and a group number is same as a variety number of color sub-pixels; and
a backlight adjusting component, connected to the backlight control component and the backlight component respectively, and configured to perform independent brightness adjustment on a backlight source of the sub-pixels of various colors in corresponding backlight sub-areas in respective frame images of a next picture;
wherein the non-display area is provided with a source electrode control chip, and the source electrode control chip is electrically connected to source electrodes of the transistors in the transistor array substrate by data lines; and
a gate electrode control chip, wherein the gate electrode control chip is electrically connected to gate electrodes of the transistors by scan lines; the source electrode control chip and the gate electrode control chip are located on a same side of the display area; the gate electrode control chip and the source electrode control chip are disposed in parallel on the same side of the display area,
wherein the backlight control component comprises:
a counting unit, configured to count average drive voltages of the sub-pixels of various colors in the first frame image area and the second frame image area corresponding to each backlight sub-area; and
a calculating unit, configured to solve the backlight brightness adjustment signals according to the average drive voltages, reference backlight brightness signals and reference drive voltages of respective backlight sub-areas.

2. The liquid crystal display device according to claim 1, further comprising a storage component, wherein the storage component is configured to store a lookup table; the lookup table is a corresponding relation table of the drive voltage of each sub-pixel in the first frame image and the second frame image corresponding to an input signal and the input signal; and the drive component acquires the drive voltage of each sub-pixel on the first frame image and the second frame image by the lookup table.

3. The liquid crystal display device according to claim 1, wherein a calculating formula for the calculating unit to solve the backlight brightness adjustment signal of the sub-pixels of each color in each backlight sub-area is as follows:

$$A_{M\_P1} * P_{M\_ave1} = A_{M\_P2} * P_{M\_ave2};$$

$$2 * A_{M\_P} * P_{M\_ave} = A_{M\_P1} * P_{M\_ave1} + A_{M\_P2} * P_{M\_ave2};$$

wherein P represents a target color sub-pixel; M represents a serial number of the backlight sub-area; $A_{M\_P1}$ represents the backlight brightness adjustment signal for performing backlight brightness adjustment on a backlight source of P sub-pixels in the backlight sub-area M corresponding to the first frame image of the next picture; $A_{M\_P2}$ represents the backlight brightness adjustment signal for performing backlight brightness adjustment on a backlight source of the P sub-pixels in the backlight sub area M corresponding to the second frame image of the next picture; $P_{M\_ave1}$ represents an average value of the drive voltages of the P sub-pixels in the backlight sub-area M corresponding to the first frame image of the current picture; $P_{M\_ave2}$ represents an average value of the drive voltages of the P sub-pixels in the backlight sub-area M corresponding to the second frame image of the current picture; $A_{M\_P}$ represents the reference backlight brightness signal of the P sub-pixels in the backlight sub-area M corresponding to the image of the current picture; and $P_{M\_ave}$ represents the average value of reference drive voltages of the P sub-pixels in the frame image area corresponding to the backlight sub-area M on the image of the current picture.

4. The liquid crystal display device according to claim 1, wherein the display component and the drive component are integrated on the display panel.

5. The liquid crystal display device according to claim 1, wherein the backlight component, the backlight control component and the backlight adjusting component are integrated on the backlight module.

6. The liquid crystal display device according to claim 1, wherein an amount of a row of transverse transistors on the transistor array substrate is larger than an amount of a column of longitudinal transistors; and the source electrode control chip and the gate electrode control chip are located on a transverse side of the display area.

7. The liquid crystal display device according to claim 1, wherein the source electrode control chip and the gate electrode control chip are both fixed on a flexible circuit board by adopting a flip chip film encapsulation manner.

8. A liquid crystal display device, comprising a display panel having a display component and a backlight module, the backlight module being divided into a plurality of backlight sub-areas, wherein the liquid crystal display device further comprises
a display area and a non-display area surrounding the display area, wherein the display area is provided with the display component, and the display component comprises a transistor array substrate; and thin film transistors in the thin film transistor array substrate are dual gate electrode transistors;
a drive component, disposed in the non-display area and connected to the display component and configured to display each picture with two frame images in sequence; the two frame images comprise a first frame image and a second frame image; drive voltages of adjacent two sub-pixels on each frame image comprise a high drive voltage and a low drive voltage, and the drive voltages of each sub-pixel in the first frame image and in the second frame image comprise a high drive voltage and a low drive voltage;
a backlight control component, connected to the drive component and configured to determine backlight brightness adjusting signals of each backlight sub-area according to the drive voltages of a first frame image area and a second frame image area corresponding to each backlight sub-area, wherein the backlight brightness adjusting signals are in groups and a group number is same as a variety number of color sub-pixels; and
a backlight adjusting component, connected to the backlight control component and the backlight component respectively, and configured to perform independent brightness adjustment on a backlight source of the sub-pixels of various colors in corresponding backlight sub-areas in respective frame images of a next picture;
wherein the non-display area is provided with a source electrode control chip, and the source electrode control chip is electrically connected to source electrodes of the transistors in the transistor array substrate by data lines; and
a gate electrode control chip, wherein the gate electrode control chip is electrically connected to gate electrodes of the transistors by scan lines; and the source electrode control chip and the gate electrode control chip are located on a same side of the display area,
wherein the backlight control component comprises:
a counting unit, configured to count average drive voltages of the sub-pixels of various colors in the first frame image area and the second frame image area corresponding to each backlight sub-area; and
a calculating unit, configured to solve the backlight brightness adjustment signals according to the average drive voltages, reference backlight brightness signals and reference drive voltages of respective backlight sub-areas.

9. The liquid crystal display device according to claim 8, further comprising a storage component, wherein the storage component is configured to store a lookup table; the lookup table is a corresponding relation table of the drive voltage of each sub-pixel in the first frame image and the second frame image corresponding to an input signal and the input signal; and the drive component acquires the drive voltage of each sub-pixel on the first frame image and the second frame image by the lookup table.

10. The liquid crystal display device according to claim 8, wherein a calculating formula for the calculating unit to solve the backlight brightness adjustment signal of the sub-pixels of each color in each backlight sub-area is as follows:

$$A_{M\_P1}*P_{M\_ave1} = A_{M\_P2}*P_{M\_ave2};$$

$$2*A_{M\_P}*P_{M\_ave} = A_{M\_P1}*P_{M\_ave1} + A_{M\_P2}*P_{M\_ave2};$$

wherein P represents a target color sub-pixel; M represents a serial number of the backlight sub-area; $A_{M\_P1}$ represents the backlight brightness adjustment signal for performing backlight brightness adjustment on a backlight source of P sub-pixels in the backlight sub-area M corresponding to the first frame image of the next picture; $A_{M\_P2}$ represents the backlight brightness adjustment signal for performing backlight brightness adjustment on a backlight source of the P sub-pixels in the backlight sub area M corresponding to the second frame image of the next picture; $P_{M\_ave1}$ represents an average value of the drive voltages of the P sub-pixels in the backlight sub-area M corresponding to the first frame image of the current picture; $P_{M\_ave2}$ represents an average value of the drive voltages of the P sub-pixels in the backlight sub-area M corresponding to the second frame image of the current picture; $A_{M\_P}$ represents the reference backlight brightness signal of the P sub-pixels in the backlight sub-area M corresponding to the image of the current picture; and $P_{M\_ave}$ represents the average value of reference drive voltages of the P sub-pixels in the frame image area corresponding to the backlight sub-area M on the image of the current picture.

11. The liquid crystal display device according to claim 8, wherein the display component and the drive component are integrated on the display panel.

12. The liquid crystal display device according to claim 8, wherein the backlight component, the backlight control component and the backlight adjusting component are integrated on the backlight module.

13. The liquid crystal display device according to claim 8, wherein an amount of a row of transverse transistors on the transistor array substrate is larger than an amount of a column of longitudinal transistors; and the source electrode control chip and the gate electrode control chip are located on a transverse side of the display area.

14. A liquid crystal display device, comprising a display panel having a display component and a backlight module, the backlight module being divided into a plurality of backlight sub-areas, wherein the liquid crystal display device further comprises
- a display area and a non-display area surrounding the display area, wherein the display area is provided with the display component, and the display component comprises a transistor array substrate; and thin film transistors in the thin film transistor array substrate are dual gate electrode transistors;
- a drive component, disposed in the non-display area and connected to the display component and configured to display each picture with two frame images in sequence; the two frame images comprise a first frame image and a second frame image; drive voltages of adjacent two sub-pixels on each frame image comprise a high drive voltage and a low drive voltage, and the drive voltages of each sub-pixel in the first frame image and in the second frame image comprise a high drive voltage and a low drive voltage;
- a backlight control component, connected to the drive component and configured to determine backlight brightness adjusting signals of each backlight sub-area according to the drive voltages of a first frame image area and a second frame image area corresponding to each backlight sub-area, wherein the backlight brightness adjusting signals are in groups and a group number is same as a variety number of color sub-pixels; and
- a backlight adjusting component, connected to the backlight control component and the backlight component respectively, and configured to perform independent brightness adjustment on a backlight source of the sub-pixels of various colors in corresponding backlight sub-areas in respective frame images of a next picture;

wherein the backlight control component comprises
- a counting unit, configured to count average drive voltages of the sub-pixels of various colors in the first frame image area and the second frame image area corresponding to each backlight sub-area; and
- a calculating unit, configured to solve the backlight brightness adjustment signals according to the average drive voltages, reference backlight brightness signals and reference drive voltages of respective backlight sub-areas;

wherein the non-display area is provided with a source electrode control chip, and the source electrode control chip is electrically connected to source electrodes of the transistors in the transistor array substrate by data lines; and a gate electrode control chip, wherein the gate electrode control chip is electrically connected to gate electrodes of the transistors by scan lines; the source electrode control chip and the gate electrode control chip are located on a same side of the display area; the gate electrode control chip and the source electrode control chip are disposed in parallel on a same side of the display area, wherein the color subpixel comprises a red subpixel, a green subpixel and a blue subpixel.

15. The liquid crystal display device according to claim 14, wherein each of the backlight brightness adjusting signal comprise a red sub-pixel backlight brightness adjusting signal group, a green sub-pixel backlight brightness adjusting signal group and a blue sub-pixel backlight brightness adjusting signal group, to perform independent backlight brightness control on the sub-pixels of various colors in respective backlight sub-areas.

* * * * *